United States Patent [19]

Lichtenstein et al.

[11] Patent Number: 5,387,634
[45] Date of Patent: Feb. 7, 1995

[54] TINTED PLEXIGLASS WITH ORGANIC PIGMENTS

[75] Inventors: Hans Lichtenstein, Babenhausen; Silvia Ebert; Manfred Krieg, both of Darmstadt, all of Germany

[73] Assignee: Roehm GmbH Chemische Fabrik, Darmstadt, Germany

[21] Appl. No.: 5,164

[22] Filed: Jan. 15, 1993

Related U.S. Application Data

[63] Continuation of Ser. No. 680,930, Apr. 5, 1991, abandoned.

[30] Foreign Application Priority Data

Apr. 5, 1990 [DE] Germany ............... 4010987

[51] Int. Cl.$^6$ ............... C08K 5/09; C08F 2/44; C08F 220/10
[52] U.S. Cl. ............... 524/321; 526/216; 526/233; 526/303.1; 526/328.5; 526/341; 526/330; 526/346; 526/261
[58] Field of Search ............... 524/321; 526/216, 233, 526/261, 303.1, 328.5, 330, 341

[56] References Cited

U.S. PATENT DOCUMENTS

| 4,773,913 | 9/1988 | Krieg et al. | 8/552 |
| 4,816,508 | 3/1989 | Chen | 524/300 |
| 5,079,295 | 1/1992 | Furuta et al. | 525/68 |

FOREIGN PATENT DOCUMENTS

| 1121810 | 1/1962 | Germany . | |
| 50-92386 | 7/1975 | Japan . | |
| 708124 | 4/1954 | United Kingdom . | |
| 1156424 | 6/1969 | United Kingdom | C08F 1/86 |

OTHER PUBLICATIONS

Database WPIL, AN 90-086457, & JP-A-2 038 439, Feb. 2, 1990.
Abstract of JP50-092386 from the WPI file of Dialog Database.

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

Opaque tinted acrylic glass produced with organic pigments or with organic dyes, which in addition to the colorant, also contains an acid in the polymer matrix, exhibits improved resistance to weathering.

16 Claims, No Drawings

TINTED PLEXIGLASS WITH ORGANIC PIGMENTS

This application is a continuation of application Ser. No. 07/680,930, filed on Apr. 5, 1991, now abandoned.

BACKGROUND OF THE INVENTION

1. Field of the Invention

The present invention relates to a acrylic glass tinted with organic pigments, with improved resistance to weathering, and a process for preparing such a acrylic glass.

2. Discussion of the Background

The basic materials for different types of acrylic glass, especially poly(methyl methacrylate), but in many instances also copolymers of methyl methacrylate, represent a practically colorless substance, whose excellent resistance to light and weathering is retained even when tinted, and which can be used for long-term applications, for example as a plate. Plastics, including acrylic plastics and, in particular, types of acrylic glass based on poly(methyl methacrylate), are used in the tinted state, to a great extent. The colorants for tinting plastics must fulfill a number of technical requirements including heat resistance, oxidation resistance, migration resistance, light resistance, resistance to weathering, and dispersibility during processing.

Transparent tints are mainly achieved with organic dyes which are truly or colloidally soluble in the monomer or the polymer, while translucent and opaque tints are obtained by using inorganic white and colored pigments or metal powder (*Kunststoff-Handbuch,* Volume IX, Polymethacrylate, Carl Hanser Verlag, Munich, 1975).

For tinting acrylic glass, cadmium pigments were or are used to a significant extent, particularly the composition cadmium sulfide or cadmium sulfide/selenide, with a color range from greenish yellow via red to dark wine red. Along with excellent dying properties and good light and heat resistance, these pigments are also characterized by good resistance to weathering. Because of their low solubility, cadmium pigments are considered to be essentially non-toxic. However, cadmium is released in an environmentally harmful form in the disposal of wastes containing cadmium, especially if they are incinerated.

For the production of acrylic glass which is practically identical in color with those tinted with cadmium pigments, but free of cadmium pigments, organic coloring pigments available on the market are being tested for their utility and are being used. Instead of organic coloring pigments, colorants which consist of a soluble organic dye and pigment, e.g., titanium dioxide, i.e., pigment preparations, can also be tested and used as a cadmium pigment substitute. (Ullmann, *Encyklopadie der technischen Chemie,* 4th edition, Volume 15, pp. 275–279).

Previous work with substitute tints similar to cadmium pigment has shown that acrylic glass tinted in this way has significantly reduced resistance to weathering as compared with known types of acrylic glass tinted with cadmium pigments.

Thus, the acrylic glass produced with organic coloring pigments or with organic dyes cannot meet all the requirements as they are known in the state of the art and demanded for acrylic glass which contains inorganic colored pigments. In addition to poor distribution of the colorants in the glass, the long-term behavior of the tints in acrylic glass, in particular, shows that their resistance to weathering must be improved. Thus, there remains a need for acrylic glass tinted with an organic pigment or an organic dye which is free of the above-described drawbacks.

SUMMARY OF THE INVENTION

Accordingly, it is one object of the present invention to provide novel acrylic glass tinted with an organic pigment or an organic dye, which exhibits improved resistance to weathering.

It is another object to provide acrylic glass tinted with an organic pigment or an organic dye, which possesses long-term stability.

These and other objects, which will become apparent during the following detailed description, have been achieved by the inventors' discovery that the weather resistance of opaque tints in acrylic glass, containing organic coloring pigments or organic dyes, is improved by the presence of acids in the polymer matrix, i.e., the color or the color tone achieved during tinting is essentially stabilized against the influence of weathering. The present invention makes the light and weather resistance of the tint achieved with organic pigments comparable to the excellent light and weather resistance of polymethyl methacrylate, i.e., the basic polymer matrix of acrylic glass.

The acids which are present in the tinted polymer matrix and which stabilize the tint are chemical compounds which contain ionogenically bonded hydrogen atoms (i.e., hydrogen atoms which dissociate to form $H^+$ ions), which can be substituted with metal atoms, forming salts. These acid chemical compounds can be either inorganic and organic acids, they can be monovalent or multivalent acids and their acid strength, measured as the degree of dissociation, can be practically between 0.1 and 100%, i.e., weak and/or strong acids can be used as coloring stabilizers.

To stabilize the tint, the acids are required in amounts of 0.01 to 3% by weight, relative to the weight of the tinted acrylic glass. The solubility of the acids in the glass polymer matrix is $\geq 0.01\%$ by weight.

The invention accordingly relates to:

Opaque tinted acrylic glass, containing an organic pigment or an organic dye, in which the acrylic glass comprises A) a polymer matrix which is composed of 70 to 100% by weight of methyl methacrylate monomer units,
B) 0.01 to 5% by weight of an organic pigment or a colorant containing an organic dye,
C) 0.01 to 3% by weight of an acid present in the polymer matrix, and
D) 0 to 3% by weight of additional additives.

DETAILED DESCRIPTION OF THE PREFERRED EMBODIMENTS

The acid can be dissolved in the polymer matrix and/or built into it by copolymerization or by conversion of the formed polymer (e.g., hydrolysis of an ester group of a unit derived from methyl methacrylate to form a unit corresponding to one derived from methacrylic acid), and/or be physically or chemically bonded to the organic pigment or the organic dye, respectively.

The production of the acrylic glass according to the present invention, with an opaque tint, is carried out according to conventional methods, by polymerization, of correspondingly composed monomer dispersions or prepolymer dispersions, or of monomer-polymer dispersions (weight ratio approximately 95:5 to 60:40).

Organic colored pigmented acrylic glass obtained in this way has a very high resistance to weathering according to weathering experiments in long-term tests, and therefore is equivalent to the bright acrylic glass colorings achieved with the cadmium pigments. A main area of use for acrylic glass tinted in this way is outdoor advertising.

A) Monomers for the Production of the Polymer Matrix

The matrix polymer, which contains 70 to 100% by weight, preferably 80 to 99.99% by weight, particularly preferably 90 to 99% by weight, methyl methacrylate monomer units can also be composed of additional comonomers in a proportion of 0 to 30% by weight, preferably 0.01 to 20% by weight, particularly preferably 1 to 10% by weight. As suitable comonomers, other esters of methacrylic acid or acrylic acid, such as, e.g., acrylic acid methyl ester, acrylic acid butyl ester, methacrylic acid ethyl ester, 2-hydroxyethyl acrylate, 2-hydroxypropyl methacrylate, and glycidyl methacrylate should be mentioned; furthermore, amides of acrylic or methacrylic acid, such as acrylamide and methacrylamide, as well as N-substituted amides derived therefrom, among them N-methyl methacrylamide. Furthermore, acrylonitrile, styrene, α-methyl styrene, vinyl esters of carboxylic acids, such as vinyl acetate, can be used as additional comonomers in the production of the acrylic glass matrix.

The use of cross-linking monomers, such as, e.g., ethylene glycol dimethacrylate, 1,4-butanediol dimethacrylate or allyl compounds, such as, e.g., allyl methacrylate or triallyl cyanurate, in proportions of 0.01 to 5% by weight, preferably 0.1 to 2% by weight, particularly preferably 0.1 to 1% by weight, of the matrix polymer, should be especially mentioned.

B) Organic Pigments and Organic Dyes for Colored Pigmentation

The colorants which are suitable for use in the present invention are compiled in H. F. Mark et al, *Encyclopedia of Polymer Science and Technology*, 2nd Ed., vol. 3, pp. 746–758, John Wiley (1985), which is incorporated herein by reference. The suitable colorants may be classified in the following classes (the names of individual colorants are according to the Colour Index (CI).
Dyes:
  AZO dyes, e.g. Oil Orange (Solvent Yellow 14)
  Anthraquinone dyes: e.g. Solvent Red 111, Disperse Violet 1, Solvent Blue 56, Solvent Green 3.
  Xanthene dyes: e.g. Rhodamine B, Solvent Green 4, Acid Red 52, Basic Red 1, Solvent Orange 63.
  Azine Dyes: e.g. Indulene Base.
  Moreover: Brilliant Sulfoflavine, Acid Yellow 7.
Pigments:
  Monoazo Pigments: e.g. Permanent Yellow FGL (PY 97), Permanent Red 2 B (PR 48)
  Disazo Pigments: Benzidine Yellows AAMX, AA, OT, AA OA, HR Yellow (PY 13, 14, 17 and 43).
  Disazo Condensation Pigments:
  Quinacridone Pigments: e.g. Pigment Violet 19
  Diaoxazine Violet Pigment Red 122
  Vat Pigments: e.g. Isoviolanthrene Violet (PV 31, PV 33)
  Perylene Pigments: e.g. PR 123
  Thio indigo Pigments: e.g. PR 88, PR 198
  Phthalocyanine Pigments: e.g. 2Y, 3Y, 6Y, 8Y
  Tetrachloroisoindolinones.

For colored pigmentation of acrylic glass, according to the present invention, in bright color tones of red, orange, yellow or green, conventional organic pigments for tinting plastics are suitable: e.g., Bayplast (Bayer), PV-(Echt) (Hoechst) Vynamon (ICI), Paliotol (BASF), Sandorin (Sandoz). Such pigments are predominantly heat and migration resistant and offer good wetting and dispersion properties in various plastics. Light resistance and resistance to weathering differ, on the other hand, since the same level of resistance is not required everywhere (Ullmann, *Encyklopadie der technischen Chemie*, 4th edition, Volume 15, pp. 175 to 279, especially 276).

Thus, for acrylic glass which is used outdoors for many years and has an opaque tint produced with organic colorants, it is necessary to provide stabilization for the tint. This was surprisingly achieved by the simple measure of adding acid compounds in the production of the acrylic glass.

Pigment tints which can be stabilized according to the present invention are produced with:
  Individual pigments, for example of the pigment product lines mentioned above, such as, e.g., Pigment Yellow 151, Pigment Yellow 139, Pigment Red 242;
  Organic dyes, which are suitable for opaque tints in combination with white pigments, e.g., titanium oxide:
    for example, Macro-Lex dyes (Bayer), Solvaperm dyes (Hoechst) and Thermoplast dyes (BASF).

Although tints which demonstrate good light and heat resistance are achieved with the above pigments, (Ullmann, loc. cit., page 278), light resistance over many years, with simultaneous good resistance to weathering, for opaque tints and the combination of organic dyes and white pigments, in acrylic glass, is only achieved with the addition of acids according to the present invention.

As a tint for the acrylic glass, the colorant, organic pigment and/or combination of organic dye/white pigment, is contained in the acrylic glass in amounts of 0.01 to 5% by weight, preferably in amounts of 0.05 to 3% by weight, and particularly preferably in amounts of 0.1 to 1% by weight, based on the weight of the acrylic glass. Using different colorant concentrations, different tints, in other words colors, can be achieved while the acrylic glass plate thickness remains the same.

For the combinations of organic dye/white pigment, which are advantageously added, also separately, to the monomers to be polymerized, or the monomer/prepolymer mixture, the weight ratio of organic dye:pigment suitably is at 1:99 to 99:1, preferably 20:80 to 80:20.

C) Acids

The acids which are present in the opaque tinted acrylic glass and which stabilize the tint are chemical compounds with ionogenically bonded hydrogen atoms, monovalent and/or multivalent, of the inorganic or organic classification. The individual acid compounds which can be used can vary greatly in their acid strength, i.e., weak and/or strong acids can be used as coloring stabilizers. The acids to be used are generally liquids or solid substances, and have a solubility in the monomer preparation to be polymerized of at least 0.01% by weight, particularly at least 0.1% by weight. They are acids with low molecular weight, i.e., acids with a molecular weight in the range of 30 to approximately 1,000 Daltons, particularly in a range of 30 to approximately 500 Daltons. Instead of acids, their anhydrides, as acid precursors, can also be used in the production of the acrylic glass according to the present invention. On contact with $H_2O$, which is always present in amounts of at least 0.01% by weight in the acrylic glass, or diffuses into it under weathering conditions, the acid, which is necessary as coloring stabilizer, is generated from the anhydride.

Suitable inorganic acids or anhydrides are, for example: $P_2O_5$, phosphoric acid, polyphosphoric acid, boric acid or di-2-ethylhexyl phosphate as acid phosphoric ester. Organic acids or anhydrides, both saturated and unsaturated, aliphatic, aromatic or heterocyclic carboxylic acids that can be used are, for example: formic acid, acetic acid, acetic acid anhydride, lactic acid, stearic acid, acrylic acid, methacrylic acid, maleic acid, maleic anhydride, fumaric acid, itaconic acid, ascorbic acid, benzoic acid, benzophenonecarboxylic acid, benzotriazolecarboxylic acid, and cinnamic acid.

They are present in the acrylic glass in amounts of 0.01 to 3% by weight, preferably in amounts of 0.05 to 2% by weight, and particularly preferably in amounts of 0.1 to 1% by weight.

D) Auxiliary Substances

Auxiliary substances can also be contained in the acrylic glass according to the present invention, which are needed, for example, as initiators or regulators for polymerization, or furthermore also plasticizers, flame-retardants or UV-absorbers, i.e., substances which are advantageously present in the acrylic glass for specific applications. These substances are contained in the polymer in amounts of 0 to 3% by weight, preferably in amounts of 0.01 to 2% by weight, based on the weight of the acrylic glass.

It has been shown, according to the present invention, that the stabilization effect on opaque acrylic glass tints produced with organic colorants, as brought about by acids, can be advantageously further reinforced by adding UV-absorbers. Such UV-absorbers are, for example, 2-(2-hydroxy-5-methylphenyl)benzotriazole ("Tinuvin P") or bis-2,2,6,6-tetramethyl- 4-piperidyl sebacate ("Tinuvin 770"). The UV-absorbers can preferably be present in the acrylic glass in amounts of 0.05 to 1% by weight.

Production of the Polymers

Implementation of polymerization of mixtures of substances A+B+C+D can be carried out essentially by conventional methods, using experience from the state of the art, e.g., in glass chambers (cf. H. Rauch-Puntigam and Th. Völker in "Acryl- und Methacryl-verbindungen", Springer-Verlag (1967)). As initiators for radical polymerization of the monomers, i.e., the monomer/prepolymer or monomer/polymer mixture, peroxide or azo compounds can be used, for example, in the conventional amounts. To control the molecular weight, the known regulators, such as, e.g., organic SH compounds, are suitable. It is known that the degree of polymerization and therefore the molecular weight of the polymer molecules of the acrylic glass can be adjusted by the initiator concentration and/or regulator concentration. As a rule, for polymerization, the initiator amounts are at 0.01 to 1% by weight and the regulator amounts are between 0.01 and 0.5% by weight of the unsaturated compounds to be polymerized. The molecular weights (MW) of the matrix polymers are generally in the range of $2 \times 10^5$ to $5 \times 10^6$ Daltons, as determined by gel permeation chromatography (*Angew. Chemie*, Vol. 82, 675 (1970)). The matrix polymer can also be weakly cross-linked. The Vicat softening temperature (according to DIN 53 460, Method B) is generally >100° C.

Other features of the invention will become apparent in the course of the following descriptions of exemplary embodiments, which are given for illustration of the invention and are not intended to be limiting thereof.

EXAMPLES

Tests concerning the weather resistance of the tints. These were carried out by:
1. 5,000 hour Xenotest weather exposure,
2. 1 year exposure outdoors, and
3. color measurement and evaluation.

Test 1.

Implementation of the Xenotest weather exposure pursuant to DIN 53 387:
 Exposure to light:
  —102 minutes dry—at approx. 65% rel. humidity
  —18 minutes rain—at approximately 90–100% rel. humidity and 40°–55° C.

Test 2.

Outdoor weather exposure pursuant to DIN 53 386

The test was carried out in a sample rack which holds the samples inclined 45 degrees towards the south.

Test 3.

Color measurement is carried out with a spectral photometer in the range of 380–780 nm, pursuant to DIN 3, Part 4.

The color difference in $\Delta E$ values is determined pursuant to DIN 6174, between the non-exposed and the exposed sample, according to the Cielab formula for artificial daylight D65. The $\Delta E$ values are relative values, i.e., for example, a $\Delta E$ value that is twice as great indicates that the color deviation after weather exposure is twice as great.

EXAMPLE 1

First, a colorless basic mixture consisting of
100 parts prepolymer methyl methacrylate (viscosity * approximately 1,000 cP) and
0.1 parts 2,2-azobis-(isobutyronitrile) is produced.

* The viscosities of the prepolymers are determined with a rotation viscometer, pursuant to DIN 53019.

Subsequently, a color paste consisting of
0.5 parts titanium dioxide
0.025 parts Cu-phthalocyanine green (Pigment Green 7) **
0.025 parts benzimidazolone yellow (Pigment Yellow 151) and
0.3 parts of a soluble polymethyl methacrylate resin, which is dispersed in
3.0 parts methyl methacrylate with a high-speed disperser (rotor/stator principle) is added.

** The highly light-resistant and weather-resistant pigment Cu-phthalocyanine green is added in the studies according to the present invention due to better recognition of color deviation: color changes are more clearly visible.

The mixture is stirred intensively, filled into a silicate glass chamber distanced at 4 mm, and polymerized at 45° C. in a water bath for 15 hours. Polymerization is completed in a tempering cabinet at 120° C.

After cooling and unmolding, a non-transparent yellow-green acrylic glass plate is obtained.

EXAMPLE 2

First, a colorless basic mixture consisting of
100 parts prepolymer methyl methacrylate (viscosity approximately 1,000 cp)
0.05 parts 2-(2-hydroxy-5-methylphenyl)-benzotriazole and
0.1 parts 2,2-azobis-(isobutyronitrile) is produced.
Subsequently, a color paste consisting of
0.5 parts titanium dioxide
0.025 parts Cu-phthalocyanine green
0.025 parts benzimidazolone yellow (Pigment Yellow 151) and
0.3 parts of a soluble polymethyl methacrylate resin, which is dispersed in
3.0 parts methyl methacrylate with a high-speed disperser (rotor/stator principle) is added.

The mixture is stirred intensively, filled into a silicate glass chamber distanced at 4 mm, and polymerized at 45° C. in a water bath for 15 hours. Polymerization is completed in a tempering cabinet at 120° C.

After cooling and unmolding, a non-transparent yellow-green acrylic glass plate is obtained.

EXAMPLE 3

First, a colorless basic mixture consisting of
100 parts prepolymer methyl methacrylate (viscosity approximately 1,000 cP)
0.2 parts 2-(2-hydroxy-5-methylphenyl)-benzotriazole and
0.1 parts 2,2-azobis-(isobutyronitrile) is produced.
Subsequently, a color paste consisting of
0.5 parts titanium dioxide
0.025 parts Cu-phthalocyanine green
0.025 parts benzimidazolone yellow (Pigment Yellow 151) and
0.3 parts of a soluble polymethyl methacrylate resin, which is dispersed in
3.0 parts methyl methacrylate with a high-speed disperser (rotor/stator principle) is added.

The mixture is stirred intensively, filled into a silicate glass chamber distanced at 4 mm, and polymerized at 45° C. in a water bath for 15 hours. Polymerization is completed in a tempering cabinet at 120° C.

After cooling and unmolding, a non-transparent yellow-green acrylic glass plate is obtained.

EXAMPLE 4

First, a colorless basic mixture consisting of
100 parts prepolymer methyl methacrylate (viscosity approximately 1,000 cP)
0.1 parts methacrylic acid and
0.1 parts 2,2-azobis-(isobutyronitrile) is produced.
Subsequently, a color paste consisting of
0.5 parts titanium dioxide
0.025 parts Cu-phthalocyanine green
0.025 parts benzimidazolone yellow (Pigment Yellow 151) and
0.3 parts of a soluble polymethyl methacrylate resin, which is dispersed in
3.0 parts methyl methacrylate with a high-speed disperser (rotor/stator principle) is added.

The mixture is stirred intensively, filled into a silicate glass chamber distanced at 4 mm, and polymerized at 45° C. in a water bath for 15 hours. Polymerization is completed in a tempering cabinet at 120° C.

After cooling and unmolding, a non-transparent yellow-green acrylic glass plate is obtained.

EXAMPLE 5

First, a colorless basic mixture consisting of
100 parts prepolymer methyl methacrylate (viscosity approximately 1,000 cP)
0.1 parts methacrylic acid and
0.2 parts 2-(2-hydroxy-5-methylphenyl)-benzotriazole and
0.1 parts 2,2-azobis-(isobutyronitrile) is produced.
Subsequently, a color paste consisting of
0.5 parts titanium dioxide
0.025 parts Cu-phthalocyanine green
0.025 parts benzimidazolone yellow (Pigment Yellow 151) and
0.3 parts of a soluble polymethyl methacrylate resin, which is dispersed in
3.0 parts methyl methacrylate with a high-speed disperser (rotor/stator principle) is added.

The mixture is stirred intensively, filled into a silicate glass chamber distanced at 4 mm, and polymerized at 45° C. in a water bath for 15 hours. Polymerization is completed in a tempering cabinet at 120° C.

After cooling and unmolding, a non-transparent yellow-green acrylic glass plate is obtained.

EXAMPLES 6–10

These examples are carried out analogously to Examples 1–5, but instead of benzimidazolone yellow, the same amount of isoindolinone yellow (Pigment Yellow 139) is used. Non-transparent acrylic glass plates with a gray-green color tone are obtained.

EXAMPLES 11–15

These examples are carried out analogously to Examples 1–5, but instead of benzimidazolone yellow, the same amount of disazo condensation red (Pigment Red 242) is used. Non-transparent acrylic glass plates with a gray color tone are obtained.

The acrylic glass plates obtained are aged for one year with outdoor exposure pursuant to DIN 53 386, or for 5,000 hours under artificial weather conditions pursuant to DIN 53 387. Subsequently, the aged, as well as the non-exposed, test plates are measured with a spectral photometer and the color measurements are determined pursuant to DIN 5033 for artificial daylight D65. From this data, the color differences $\Delta E$ between the weathered and non-weathered samples are then calculated according to DIN 6174.

The results are summarized in the following table. Examples 1 to 3, 6 to 8 and 11 to 13 are comparison examples.

| Example | Additives* | Pigment | Color difference $\Delta E$ 1 year outdoor exposure | 5,000 hours artificial weather exposure |
| --- | --- | --- | --- | --- |
| 1 | — | Pigm. Y 151 | 7.56 | 4.53 |
| 2 | 0.05% UV | Pigm. Y 151 | 6.26 | 4.04 |
| 3 | 0.2% UV | Pigm. Y 151 | 5.12 | 3.43 |
| 4 | 0.1% MAAC | Pigm. Y 151 | 4.71 | 4.50 |
| 5 | 0.2% UV/ 0.1% MAAC | Pigm. Y 151 | 2.87 | 2.75 |
| 6 | — | Pigm. Y 139 | 2.32 | 3.08 |
| 7 | 0.05% UV | Pigm. Y 139 | 2.07 | 2.64 |
| 8 | 0.2% UV | Pigm. Y 139 | 1.86 | 2.15 |
| 9 | 0.1% MAAC | Pigm. Y 139 | 0.91 | 2.17 |
| 10 | 0.2% UV/ 0.1% MAAC | Pigm. Y 139 | 0.96 | 1.62 |
| 11 | — | Pigm. R 242 | 3.74 | 4.54 |

-continued

| Example | Additives* | Pigment | Color difference ΔE 1 year outdoor exposure | 5,000 hours artificial weather exposure |
|---|---|---|---|---|
| 12 | 0.05% UV | Pigm. R 242 | 3.32 | 4.39 |
| 13 | 0.2% UV | Pigm. R 242 | 3.00 | 3.86 |
| 14 | 0.1% MAAC | Pigm. R 242 | 2.87 | 4.16 |
| 15 | 0.2% UV/ 0.1% MAAC | Pigm. R 242 | 2.11 | 3.50 |

*UV = 2-(2-hydroxy-5-methylphenyl)-benzotriazole
MAAC = methacrylic acid

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters patent of the United States is:

1. An opaque tinted acrylic glass containing an organic pigment or an organic dye, comprising:
   A) a polymer matrix comprising 70 to 100% by weight of methyl methacrylate monomer units;
   B) 0.01 to 5% by weight of an organic pigment or a colorant containing an organic dye;
   C) 0.01 to 3% by weight of an acid having a molecular weight of 30 to 1,000 Daltons present in the polymer matrix; and
   D) 0 to 3% by weight of additional additives, prepared by forming, by polymerization, a polymer matrix which comprises 70 to 100% by weight of methyl methacrylate monomer units, in the presence of 0.01 to 5% by weight of an organic pigment or an organic dye, based on the weight of the acrylic glass, and in the presence of 0.01 to 3% by weight of said acid, based on the weight of the acrylic glass, as well as in the presence of 0 to 3% by weight of additional additives.

2. The acrylic glass of claim 1, wherein B) is an organic pigment.

3. The acrylic glass of claim 1, wherein said colorant is a combination of an organic dye and a white pigment.

4. The acrylic glass of claim 1, wherein said acid C) is an inorganic acid.

5. The acrylic glass of claim 4, wherein said inorganic acid is phosphoric acid or an acid ester of phosphoric acid.

6. The acrylic glass of claim 1, wherein said acid C) is an organic acid.

7. The acrylic glass of claim 1, wherein said acid C) is an unsaturated organic acid.

8. The acrylic glass of claim 7, wherein said acid C) is selected from the group consisting of acrylic acid, methacrylic acid, maleic acid, fumaric acid, itaconic acid and cinnamic acid.

9. The acrylic glass of claim 1, wherein said acid C) is polymerized into the polymer matrix.

10. The acrylic glass of claim 1, wherein said B) is an organic pigment and said C) is acrylic acid and/or methacrylic acid.

11. The acrylic glass of claim 1, wherein said additive D) is a UV-absorber and is present in an amount of 0.05 to 1% by weight.

12. The acrylic glass of claim 1 in the form of a plate.

13. The acrylic glass of claim 1, wherein said acid C) is a saturated organic acid.

14. The acrylic glass of claim 1, wherein said polymer matrix A) is a copolymer of at least 70% by weight of methyl methacrylate and up to 30% by weight of an ester of methacrylic acid other than methyl methacrylate, an ester of acrylic acid, an amide of acrylic or methacrylic acid, acrylonitrile, a styrene or a vinyl ester of a carboxylic acid.

15. The acrylic glass of claim 14, wherein said polymer matrix A) is crosslinked with 0.01 to 5% by weight of a crosslinking monomer.

16. The acrylic glass of claim 15, wherein said polymer matrix A) is crosslinked with ethylene glycol dimethacrylate, 1,4-butanediol dimethacrylate, allyl methacrylate or triallyl cyanurate.

* * * * *

UNITED STATES PATENT AND TRADEMARK OFFICE
CERTIFICATE OF CORRECTION

PATENT NO.  : 5,387,634
DATED       : February 7, 1995
INVENTOR(S) : Hans Lichtenstein, et al It is certified that error appears in the above-indentified patent and that said Letters Patent is hereby corrected as shown below:

On the title page: Item [54], and in column 1, lines 1-3

In the title, please delete the title and substitute therefor: --TINTED ACRYLIC GLASS WITH ORGANIC PIGMENTS--.

Signed and Sealed this

Twenty-ninth Day of August, 1995

*Attest:*

BRUCE LEHMAN

*Attesting Officer*        *Commissioner of Patents and Trademarks*